United States Patent [19]

Nordström

[11] Patent Number: 4,513,509
[45] Date of Patent: Apr. 30, 1985

[54] ATTITUDE DIRECTOR INDICATOR

[75] Inventor: Lennart Nordström, Linköping, Sweden

[73] Assignee: Saab-Scania Aktiebolag, Linkoping, Sweden

[21] Appl. No.: 568,538

[22] Filed: Jan. 5, 1984

[30] Foreign Application Priority Data

Jan. 7, 1983 [SE] Sweden ................. 8300065

[51] Int. Cl.³ ................. G01C 19/44; G08C 21/00
[52] U.S. Cl. ................. 33/330; 33/328; 340/974
[58] Field of Search ................. 33/320, 322, 328, 329, 33/330, 352; 340/973, 974, 975, 976

[56] References Cited

U.S. PATENT DOCUMENTS

| | | | |
|---|---|---|---|
| 2,262,245 | 11/1941 | Moseley et al. | 33/328 |
| 2,779,101 | 1/1957 | Chombard | 33/330 |
| 2,940,176 | 6/1960 | Jessup | 33/330 |
| 2,941,306 | 6/1960 | Uecker | 33/330 |
| 3,039,200 | 6/1962 | Vibert | 33/328 |
| 3,263,646 | 8/1966 | Arnold et al. | 33/330 |
| 3,516,055 | 6/1970 | Snider | 340/975 |

OTHER PUBLICATIONS

*IEEE Spectrum*, Jul. 1975, pp. 28 and 29.

*Primary Examiner*—Richard R. Stearns
*Attorney, Agent, or Firm*—James E. Nilles; James R. Custin

[57] ABSTRACT

The invention relates to an aircraft attitude indicator having a gyro controlled spherical display with delineations of regularly spaced meridians that maintain a vertical orientation and spaced parallels transverse to the meridians, one of which is an equator that divides the sphere into upper and lower hemispheres and corresponds to a horizon. The lower hemisphere has triangular pointer indicia, each symmetrical to a delineated meridian and with a base on a parallel and an apex proximal to the equator. The pointer indicia cooperate with a reference delineation that is relatively fixed with respect to the aircraft and substantially centered on the display. The pointer indicium nearest the reference designates the "up" direction; those adjacent to it provide information about changes in aircraft attitude relative to "up" that will result from possible maneuvers from the existing attitude.

7 Claims, 10 Drawing Figures

ATTITUDE DIRECTOR INDICATOR

FIELD OF THE INVENTION

This invention relates to attitude indicating instruments for aircraft and is more particularly concerned with improvements in an attitude indicator that provides information about the pitch and roll attitudes of the carrying aircraft and may also provide information about its directional attitude or heading, and wherein the display of attitude information is in the form of a surface of revolution having delineations of regularly spaced meridians that maintain a vertical orientation in space and regularly spaced parallels transverse to the meridians, one of said parallels being an equator that divides the display into upper and lower halves and corresponds to a horizon.

BACKGROUND OF THE INVENTION

Aircraft attitude indicators of the general type to which this invention relates are disclosed in U.S. Pat. Nos. 2,779,101 to Chombard and 3,516,055 to Snider. Attitude instruments embodying the principles disclosed in those patents are in substantial commercial use.

In certain of its forms such an attitude indicator has a spherical display that is gyro controlled so that regularly spaced meridians delineated on the spherical display are maintained in a vertical orientation in space and regularly spaced parallels that are transverse to the meridians are correspondingly maintained horizontal.

Such a prior display is illustrated in FIG. 1. One of the delineated parallels is an equator that divides the displayed sphere into upper and lower hemispheres and corresponds to the horizon. Relatively fixed to the aircraft in substantially centered relation to the display is an indicator or reference that symbolizes the carrying aircraft and relates its attitude to the attitude of the delineated meridians and parallels on the displayed sphere. Typically this reference takes the form of a circle or dot that symbolizes the fuselage of the carrying aircraft to denote pitch and heading attitudes together with aligned horizontal dashes or bars at opposite sides of the circle or dot that symbolize the wings and show roll or banking attitude. In level flight the airplane symbol is on the equator delineation of the spherical display, and attitudes of climb or dive are indicated by departures of the equator from that symbol, which departures correspond in direction and magnitude to the direction and magnitude of departure of the longitudinal axis of the aircraft from its normal level flight attitude. In like manner, roll attitudes are depicted by the angle between the equator and the wing symbols of the reference.

Thus, the equator of the spherical display provides a horizontal reference to which the pilot relates the attitude of the aircraft in the same way that he relates aircraft attitude to the natural horizon under visual flight conditions. The meridian delineations of the display can be marked in terms of compass headings and can be confined to fixed orientations in space so that the instrument can combine pitch and roll information with information that would otherwise have to be obtained from a separate directional gyro instrument.

In a steep dive or climb under visual flight conditions the pilot cannot see the horizon by looking forward but must orient himself by looking to one side or the other to find the horizon. However, the presentation on a conventional spherical display attitude indicator is analogous to what the pilot could see if restricted to forward vision under visual flight conditions. Consequently there are ranges of diving and climbing attitudes in which the equator line of the attitude display is only partly visible at one side of the display, or is not visible at all. What this means, in practical effect, is that the heretofore conventional attitude indicator gives the pilot the least information about the attitude of his aircraft under precisely those conditions of maneuvering flight in which he most needs to have information that will orient him.

Stated very simply, a conventional attitude indicator tells the pilot where the horizon is, but in steeply climbing and steeply diving flight it does not clearly tell him which way is "up" and thus leaves him without the information that he most needs for recovery from his abnormal attitude. Of course "up" and "down" information is not critically important in a steep climb, but it is absolutely essential for successful recovery from a steep dive. The failure of heretofore conventional attitude indicators to provide such information has been particularly troublesome in maneuvers that combined roll with a diving angle of more than 45°. In fact, investigation has shown that crashes and near-accidents have resulted from misinterpretation of the information presented by prior attitude indicators, which is to say that such indicators did not clearly and unambiguously present the information most needed, or did not present that information at all.

From the fact that the above mentioned Chambord patent issued in 1957, and the further fact that losses of life and of aircraft are known to have resulted from the deficiencies of prior attitude indicating instruments, it is apparent that the solution to the problem posed by such indicators has not been obvious to those skilled in the art.

SUMMARY OF THE INVENTION

In general, the object of this invention is to provide an aircraft attitude indicator with a gyro controlled display which presents vital information not readily available from heretofore conventional attitude indicators and which, in particular, presents a clear and unambiguous indication of the "up" direction when the carrying aircraft is in steeply diving attitudes.

Another and very important object of this invention is to provide an attitude indicator of the character described wherein the display that is movable relative to the aircraft cooperates, during steep dives, with the conventional relatively fixed indicator means to provide a clear and unambiguous indication of the "up" orientation relative to the earth's surface, along with clear information, especially useful in a rolling dive, about the direction of roll that will bring the aircraft most quickly out of the dive.

Thus, simply stated, the invention has as its object to provide an attitude indicator for an airplane whereby the pilot is informed, when in a steep rolling dive, both which way is "up" and how to get away from "down" most quickly.

In general, these and other objects of the invention that will appear as the description proceeds are achieved in the attitude indicator of this invention, which is an instrument carried in an aircraft for displaying the attitude of the aircraft about at least its roll and pitch axes, and which is of the type having a gyro controlled display in the form of a surface of revolution concentric to and rotatable about a first display axis parallel to said pitch axis and rotatable about a second display axis parallel to said roll axis and whereon there is a delineation of an equator lying in a plane containing said first display axis that divides the display into upper and lower halves and corresponds to a horizon, said instrument further comprising indicator means relatively fixed with respect to the aircraft and substantially centered on said display delineating a reference that relates the attitude of the aircraft about its said axes to said equator. The instrument of this invention is characterized by a plurality of pointer indicia on said lower half of the display, each having a pointing apex which is proximal to said equator and which thus cooperates with said reference to provide an unambiguous and self-explanatory indication of the "up" direction relative to the earth, said pointer indicia being spaced apart circumferentially at substantially regular intervals about said first display axis to cooperate with said reference in providing said "up" indication in all diving attitudes of the aircraft.

Preferably the delineation on the display includes regularly spaced meridians that maintain a vertical orientation in space and parallels transverse to the meridians that are spaced at said substantially regular intervals from the equator. Along each of said parallels there is a set of pointer indicia, comprising a pointer indicium for each meridian, each pointer indicium being symmetrical to its meridian and having its apex thereon.

Preferably the pointer indicia are triangles of a solid color that contrasts with the background color of the lower hemisphere and are arranged along at at least two of the parallels in said lower hemisphere, with the indicia along each parallel having their bases coinciding with that parallel, and with like numbers of such indicia on the respective parallels.

BRIEF DESCRIPTION OF DRAWINGS

In the accompanying drawings, which illustrate what are now regarded as preferred embodiments of the invention.

DETAILED DESCRIPTION OF PREFERRED EMBODIMENTS OF THE INVENTION

In certain of its embodiments an aircraft attitude indicator of this invention has a gyro controlled spherical display 2 that is visible through a concentric circular window or opening 3 of substantially the same diameter as the spherical display. The spherical display has markings as described hereinafter whereby its rotations about three coordinate axes through its center are made apparent.

Figure 3:
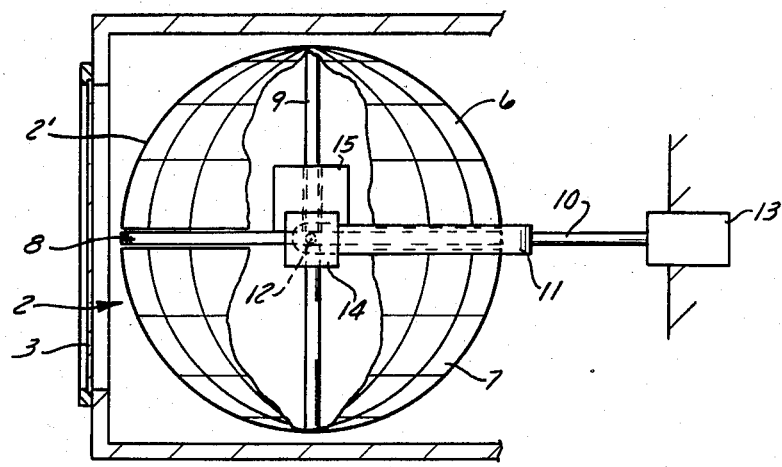
FIG. 3 is a more or less diagrammatic view of a mechanical embodiment of the three-axis attitude indicator of this invention, showing how it is gyro stabilized in space relative to its three axes.
Figure 4:
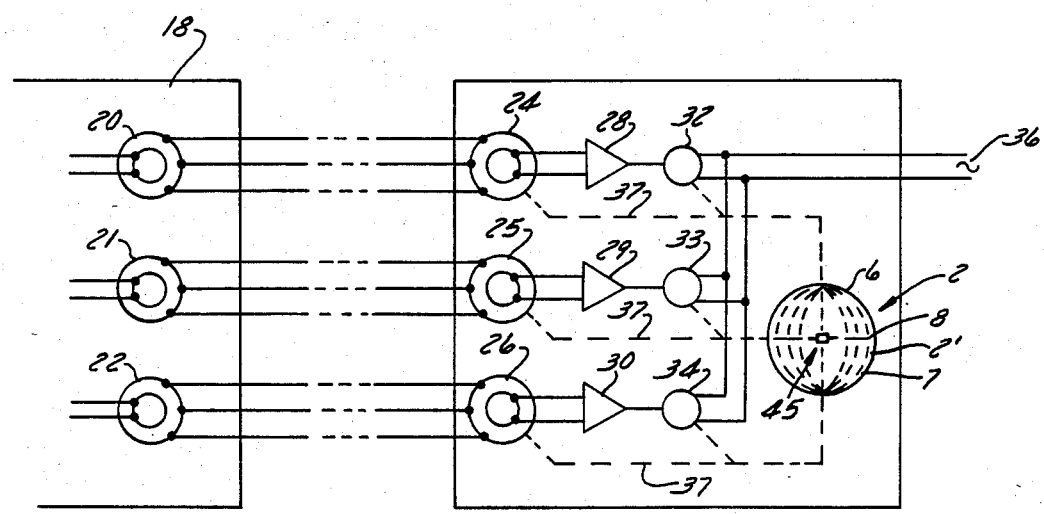
FIG. 4 is a schematic diagram of an electromechanical embodiment of a three-axis attitude indicator.

In one of its possible forms, illustrated in FIG. 3, the spherical display 2 comprises a physical sphere 2', consisting of upper and lower hemispherical shells 6, 7 that are supported at opposite sides of a circular equatorial plate 8 by means of a shaft 9 which extends through the center of the plate 8 and is journaled in it. The shaft 9 is connected to the shells 6, 7 at their poles to constrain them to rotate in unison relative to the plate 8. The plate is gimbal mounted on a fork comprising a rotatable shaft 10 that has its axis parallel to the longitudinal or roll axis of the carrying aircraft and to which is symmetrically fixed a half-ring 11 upon which the plate 8 is pivoted at its diametrically opposite sides, as at 12, to swing relative to the half-ring 11 about an axis which is normal to the axes of the respective shafts 9 and 10 and which extends laterally relative to the carrying aircraft. Connected between the shaft 10 and the aircraft structure is a roll servo 13. Connected between the plate 8 and the half-ring 11 is a pitch servo 14. Mounted on the plate 8 for driving the shaft 9 that connects the hemispheres 6, 7 is a direction servo 15. As shown diagrammatically in FIG. 4, the servos 13, 14, 15 are gyro controlled to position the spherical display in accordance with the attitude of the aircraft about its roll, pitch and yaw axes, respectively. The controlling gyros are mounted on a gyro platform 18 that can be located remotely from the attitude indicator and can comprise, for example, the gyro platform of an inertial navigation system. Pitch, roll and yaw displacements of the gyro platform 18 are picked up by sensors 20, 21, 22, which can comprise synchro transmitters and which produce electrical signals corresponding to the attitude of the aircraft that are fed to respective control transformers 24, 25, 26. The outputs of the respective transformers, passed through amplifiers 28, 29, 30, are employed for control of respective servo motors 13, 14, 15 that are energized from a current source 36 and drive the sphere 2' about the respective longitudinal, lateral and vertical axes. Feedback loops 37 ensure that the relative attitude of the display is in accurate correspondence with the outputs of the control transformers 24, 25, 26. The electromechanical display embodiment just described avoids problems due to mass and kinetic forces at the display itself that are mentioned in U.S. Pat. No. 2,779,101.

It will be apparent that with any display mechanism comprising a physical three-dimensional sphere, the sphere may be located remotely from the window 3, and the display itself, as seen by the pilot, may be a reflected or projected image of the sphere 2'.

Figure 5:
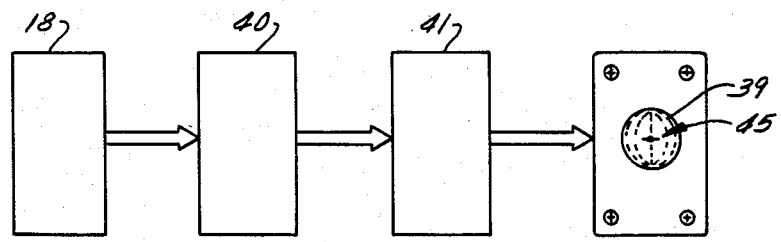
FIG. 5 is a schematic diagram of apparatus for producing a computer generated spherical display.

Similarly, the display can be a computer generated image of a sphere, presented on a cathode ray tube 39 or the like by means of apparatus such as is schematically illustrated in FIG. 5, wherein 18 designates a gyro platform with sensors 20, 21, 22 from which signals corresponding to relative displacements about the three axes are fed to a signal processing unit 40. The output of the signal processing unit 40 is fed to an image generating unit 41 which controls the display at the display unit 39 that is seen by the pilot.

Irrespective of the particular nature of the spherical display or the mechanism by which it is presented, an attitude indicator of this invention comprises an indicator means or reference 45 that delineates a stylized airplane in the form of a central dot or circle 46 with horizontally aligned bars 47 at its opposite sides, as is generally conventional. Since the pilot "flies" the reference 45 relative to the spherical display 2, he regards the reference, for practical purposes, as fixed in relation to the carrying aircraft. However, the indicator means 45 is not fixed in the aircraft in an absolute sense; it is at least manually adjustable vertically, to accommodate varying conditions of nose-up and nose-down trim; it may be adjustable laterally for special maneuvers (e.g., tactical maneuvers); and it may be caused to move automatically to some extent for special flight situations. Thus the reference indicator means 45 is herein said to be relatively fixed with respect to the carrying aircraft, and making allowance for its limited mobility, it can be said to be substantially centered on the spherical display 2.

In whatever form the spherical display 2 is presented, there are delineated on the sphere meridians 48 which extend from pole to pole and depict a vertical orientation in space and parallels 49 which lie in planes normal to the polar axis and thus depict a horizontal orientation. The meridians 48 are preferably spaced at regular angles around the spherical display; and where the instrument presents heading or directional attitude information in addition to pitch and roll information, there will be suitable compass direction indicia on the meridians, preferably along the equator and along a medial parallel in each hemisphere, as shown. The equator is of course a particularly delineated parallel 49', and the other parallels 49 are delineated at regularly spaced intervals at each side of it.

According to the invention, the spherical presentation 2 is further provided with pointer indicia 50 that cooperate with the reference to provide an unambiguous and self-explanatory indication of the "up" direction. These pointer indicia 50 are preferably triangles, with apexes pointing upwardly; but it will be understood that other pointer configurations would be suitable, such as inverted V's that have their apexes upward.

Figure 1:
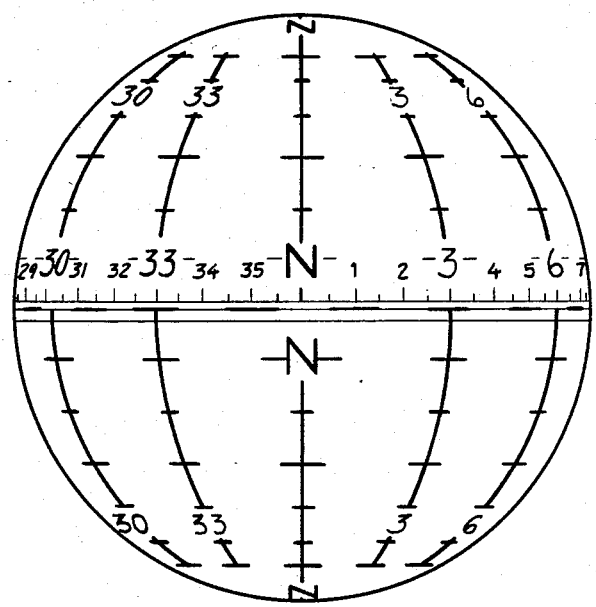
FIG. 1 illustrates the display presented by a heretofore conventional aircraft attitude indicator, as described hereinabove.
Figure 2:
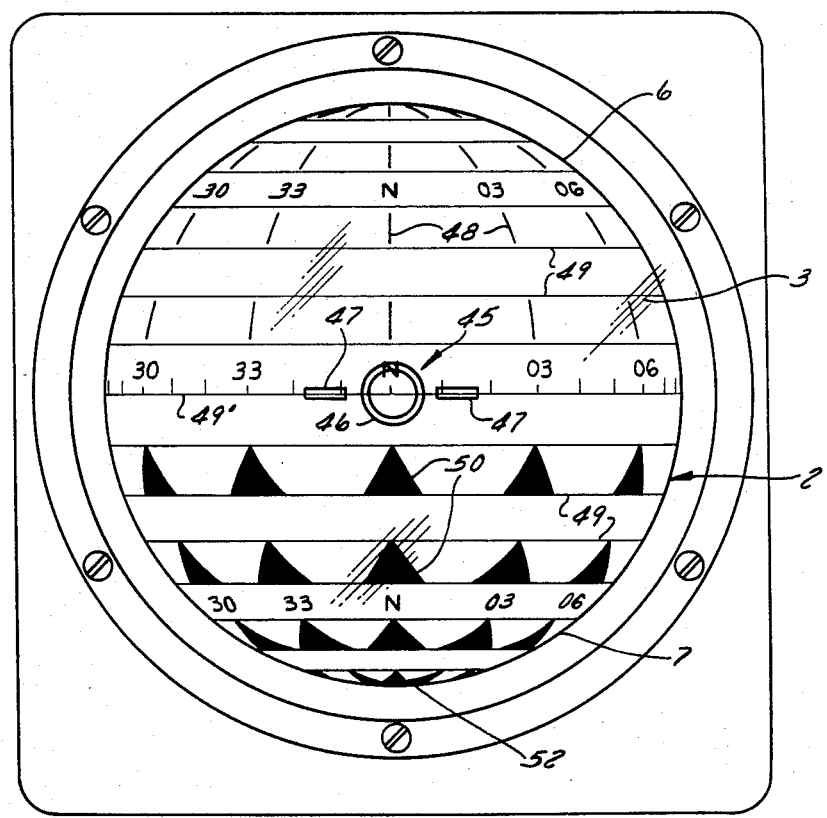
FIG. 2 is a view of an attitude indicator of this invention, as seen by the pilot of an aircraft in which it is installed, shown as it appears in straight and level flight.

In the embodiment illustrated in FIG. 2 the two hemispheres 6, 7 of the spherical presentation have the same background color (e.g., white), and the lower hemisphere 7, which is predominantly visible to the pilot during a dive, is immediately distinguishable from the upper one by the fact that the pointer indicia 50 are present only on it. The indicia 50, like the meridian and parallel delineations, are in a color that is in contrast to the background color of the sphere. As shown in FIG. 2, the parallels or latitude delineations 49 are in full lines, at 10° intervals, and the meridians or longitude markings 48 are at 30° intervals and are delineated in the upper hemisphere 6 by broken lines which are interrupted at the parallels. In this case the meridian lines are imaginary in the lower hemisphere but are nevertheless well defined for the pilot by reason of every pointer indicium 50 being symmetrical to an extension of a meridian line 48 delineated in the upper hemisphere 6, with its apex on that line. Furthermore, the pointer indicia 50 are arranged in horizontally aligned sets that are spaced apart by 20° of longitude, and in every set there is a pointer indicium on each of the meridians 48 that are delineated in the upper hemisphere. In this case, each pointer indicium is a solid-color triangle that has its base coinciding with one delineated parallel 49 and has its apex on the next delineated parallel nearer the equator, and all of the indicia are of like size except those nearest the lower pole, which are narrower and are connected with one another to form a compass rose 52.

Figure 6:
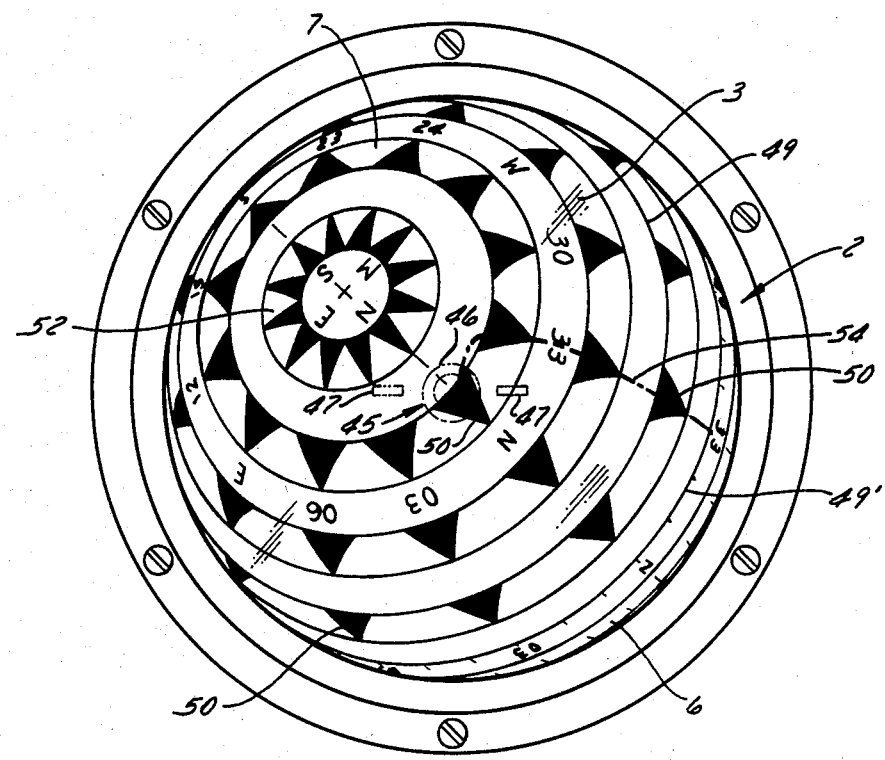
FIG. 6 is a view generally like FIG. 2 but showing the display as it appears in a steep rolling dive.

FIG. 2 shows the display as it appears to the pilot in straight and level flight, while FIG. 6 shows it as it would appear in a partially inverted attitude of the aircraft in a steep rolling dive. In FIG. 6, note that the equator 49' is barely visible at the edge of the window, in the lower right hand quadrant, corresponding to the limited view of the horizon that the pilot would have under the same conditions. However, the indicium 50 that is nearest the reference 45 clearly designates the "up" direction and signifies the partially inverted attitude of the aircraft. Equally important, the indicia adjacent to the one under the reference marker 45 clearly signify the consequences of any change in attitude. Thus it is apparent from the indicia to the left of the reference 45 that rolling to the left would steepen the dive before recovery from it could begin, whereas it is apparent from the indicia to the right of the reference 45 that recovery to level flight can be obtained most quickly by a sharp roll to the right followed by a straight pull-up, to carry the aircraft through the progression of attitudes denoted by the broken line 54. In like manner, the consequences of a slower roll to the right can be readily visualized from the indicia aligned along the "30" meridian.

Figure 7:
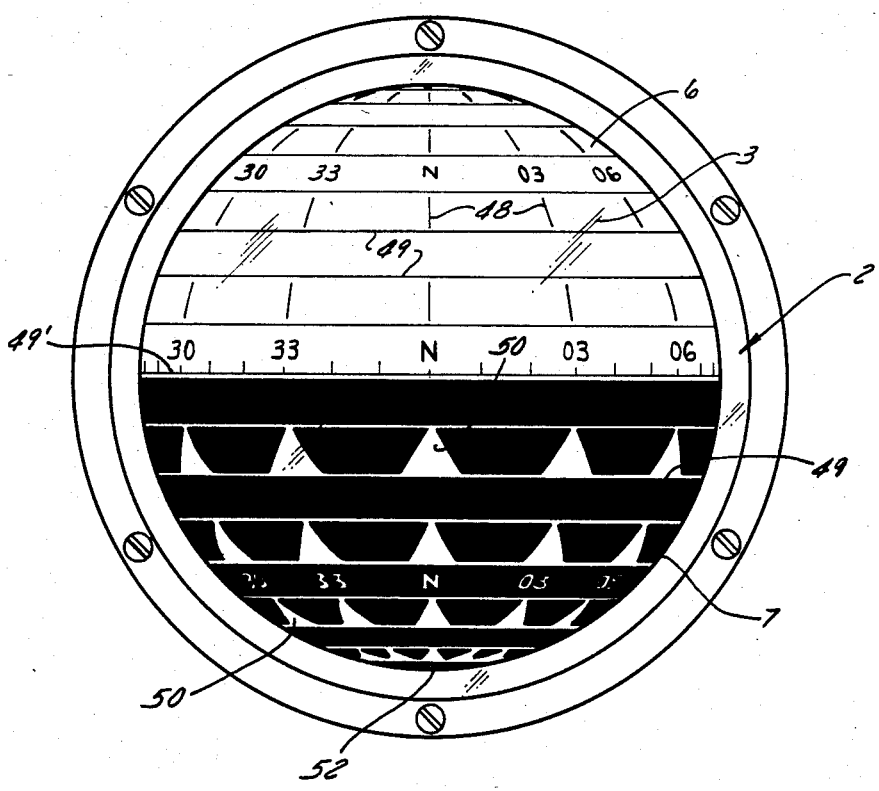
FIGS. 7 and 8 illustrate modified embodiments of the spherical display that characterizes the attitude indicator of this invention.

The embodiment of the invention illustrated in FIG. 7 is basically like that of FIG. 2, but the background color of the lower hemisphere is dark while the indicia 50 on it are of a contrasting light color, as is the upper hemisphere. In FIG. 7, too, the sets of pointer indicia 50 are of progressively decreasing width away from the equator.

Figure 8:
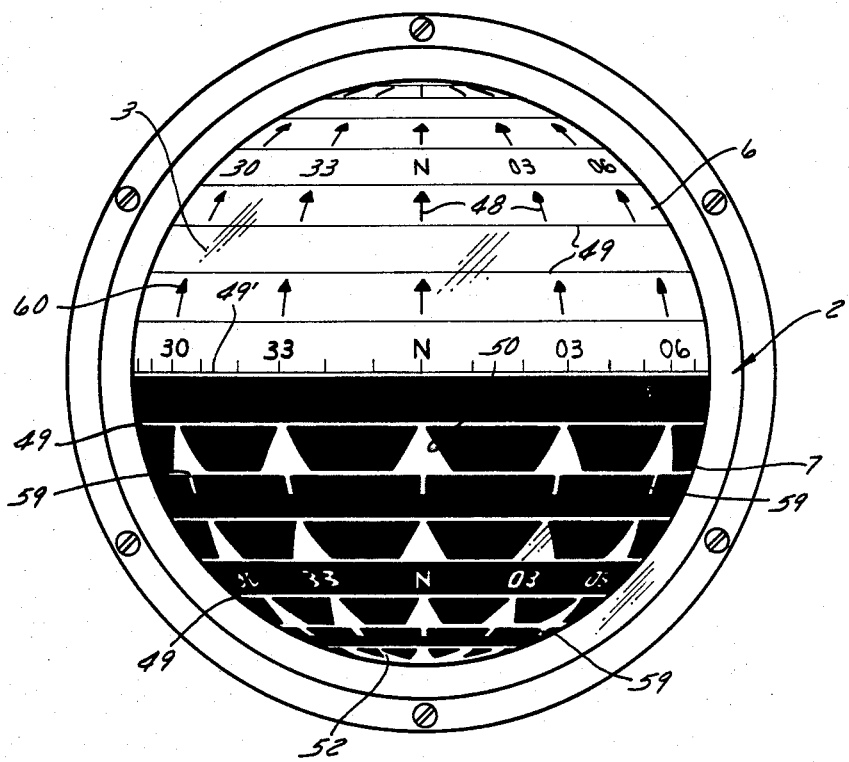

FIG. 8 illustrates another variant form of the spherical display 2 which is generally like that of FIG. 7, but wherein the pointer indicia 50 of alternate sets in the lower hemisphere 7 have shaft-like appendages 59, to have an arrowhead form, and these appendages define broken meridian lines. Further in FIG. 8 the dashes of the broken meridian lines in the upper hemisphere 6 terminate at their upper ends in small triangles 60 that have their apexes uppermost, so that "up" orientations are provided in steep climbs as well as in dives. Because the background colors of the two hemispheres 6, 7 are different and contrasting, and the triangular indicia 60 in the upper hemisphere are much smaller than those in the lower hemisphere, climb indications are distinctly different from dive indications.

The attitude indicator of this invention was tested in actual flight comparisons to a conventional attitude indicator with a spherical display by nine experienced pilots, who rated the two types of indicators on the following scale:
 1. Very good
 2. Good
 3. Acceptable
 4. Acceptable with reservations
 5. Unacceptable.

Notwithstanding their unfamiliarity with the indicator of this invention, the average of their ratings for it was 2.6, whereas the average of their ratings for the conventional indicator was 3.5; that is, they judged the indicator of this invention to be substantially better than the conventional one.

Figure 9:
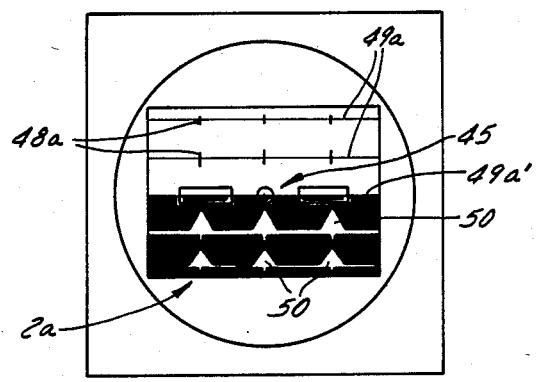
FIG. 9 is a view generally similar to FIG. 2 but showing an attitude indicator having a cylindrical display.
Figure 10:
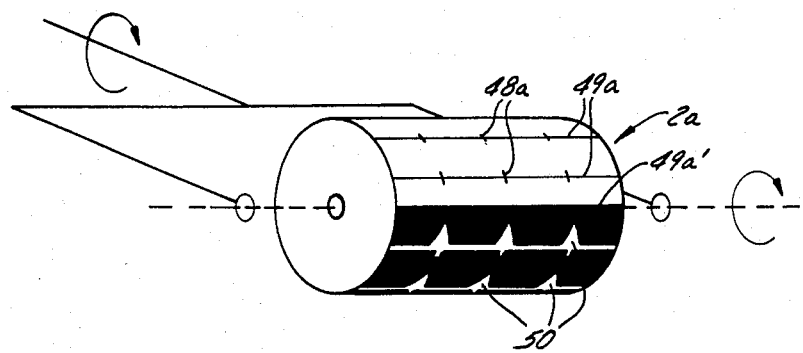
FIG. 10 is a more or less diagrammatic view of the display itself that is shown in FIG. 9.

FIGS. 9 and 10 illustrate a simplified form of attitude indicator embodying the principles of this invention, suitable for installations where only pitch and roll attitude information are to be presented by the attitude indicator, and directional or heading information is presented by another instrument. In this case tne display 2a is in the form of a cylinder which, again, can be present either as a three-dimensional object or as a reflected, projected or generated image. The axis of the cylinder extends transversely to the longitudinal or roll axis of the aircraft and is gyro stabilized to remain horizontal in space, while the cylinder rotates about its axis, under gyro control, in accordance with the pitch attitude of the aircraft. In this case, again, meridians 48a and parallels 49a are delineated, the meridians 48a lying in planes normal to the cylinder axis and spaced regularly along the length of the cylinder. The cylinder is divided into upper and lower halves by a delineated equator 49a' which is that one of the parallels that contains the axis of the cylinder and which corresponds to a horizon; and the remaining parallels 49a are spaced at regular intervals at opposite sides of the equator. Preferably the two halves of the cylinder that are defined by the equator 49a' have contrasting background colors, as in the previously described embodiments.

Pointer indicia 50 are in this case, too, delineated on the bottom half of the display, at regular circumferentially spaced intervals around the horizontally extending cylinder axis, and each indicium has its apex proximal to the equator, 49a' to cooperate with the reference 45 in providing an unambiguous and self-explanatory indication of the "up" direction relative to the earth's surface. The indicia 50 are preferably arranged in sets, the indicia of each set being horizontally aligned along one of the delineated parallels, and each indicium of a set being symmetrical to one of the delineated meridians with its apex on that meridian.

From the foregoing description taken with the accompanying drawings it will be apparent that this invention provides an improved aircraft attitude indicator of the type having a display on which meridians and parallels are designated, whereby the instrument achieves a capability for presenting, in a clear and unambiguous manner, critically important orientation information not available from prior instruments of that type. It will also be apparent that the marked advantages of the invention, which substantially contribute to flight safety, are achieved without a significant increase in the cost of the instrument.

What is claimed as the invention is:

1. An instrument carried in an aircraft for displaying the attitude of the aircraft about its pitch and roll axes, said instrument being of the type having a gyro controlled spherical display on which there are delineations of regularly spaced meridians that maintain a vertical orientation relative to the earth and spaced parallels transverse to the meridians, one of which is an equator that divides the sphere into upper and lower hemispheres and corresponds to a horizon, said instrument further comprising indicator means relatively fixed with respect to the aircraft and substantially centered on said display delineating a reference that relates the attitude of the aircraft to said meridians and parallels, said instrument being characterized by:

a plurality of pointer indicia on the lower one of said hemispheres, at least one for each of said meridians, each having a pointing apex, each said indicium
(1) being symmetrical to its meridian with its apex on that meridian and
(2) having its apex proximal to said equator, so that the one of said indicia that is nearest said reference provides an unambiguous and self-explanatory indication of the "up" direction relative to the earth, and indicia adjacent to that one provide information about changes of the aircraft attitude relative to that "up" direction that will result from possible changes in its existing attitude.

2. The instrument of claim 1 wherein there are at least two of said pointer indicia in the lower one of said hemispheres for each meridian, the pointer indicia for each meridian being spaced at substantially regular intervals from one another and said equator, with a pointer indicium for each meridian aligned along one of said parallels with a pointer indicium for every other meridian.

3. The instrument of claim 1 wherein each of said pointer indicia is a triangle of a color that contrasts with the background color of the lower one of said hemispheres.

4. The instrument of claim 1 wherein each of said pointer indicia is substantially triangular, with a base on one of said delineated parallels and remote from said equator.

5. An instrument carried in an aircraft for displaying the attitude of the aircraft about its roll and pitch axes, said instrument being of the type having a gyro controlled spherical display on which there are delineations of regularly spaced meridians that maintain a vertical orientation in space and spaced parallels transverse to the meridians, one of which is an equator that divides the sphere into upper and lower hemispheres and corresponds to a horizon, said instrument further comprising indicator means relatively fixed with respect to the aircraft and substantially centered on said display delineating a reference that relates the attitude of the aircraft to said meridians and parallels, said instrument being characterized by:

a plurality of triangular indicia on the lower one of said hemispheres, each said indicium
(1) having a base coinciding with one of said parallels,
(2) being symmetrical to one of said meridians to have an apex on that meridian, and
(3) having its said apex nearer to said equator than its said base, so that the one of said indicia that is nearest said reference provides an unambiguous and self-explanatory indication of the "up" direction relative to the earth and indicia adjacent to that one provide information about changes in the aircraft attitude in relation to that direction that will result from possible maneuvers from its existing attitude.

6. An instrument carried in an aircraft for displaying the attitude of the aircraft about its pitch and roll axes, said instrument being of the type having a gyro controlled display in the form of a surface of revolution concentric to and rotatable about a first display axis parallel to said pitch axis and rotatable about a second display axis parallel to said roll axis, and whereon there is a delineation of an equator lying in a plane containing said first display axis that divides the display into upper and lower halves and corresponds to a horizon, said instrument further comprising indicator means relatively fixed with respect to the aircraft and substantially centered on said display delineating a reference that relates the attitude of the aircraft about its said axes to said equator, said instrument being characterized by:

a plurality of pointer indicia on said lower half of the display,
(1) each having a pointing apex which is proximal to said equator and which thus cooperates with said reference to provide an unambiguous and self-explanatory indication of the "up" direction relative to the earth, and
(2) said pointer indicia being spaced apart circumferentially at substantially regular intervals about said first display axis to cooperate with said reference in providing said "up" indication in all diving attitudes of the aircraft.

7. The instrument of claim 6, further characterized by: said indicia being arranged in sets that are spaced apart at said intervals, each set comprising a plurality of said indicia that are disposed along a line parallel to said equator and are spaced apart substantially regularly along that line.

* * * * *